United States Patent [19]

Nagashima

[11] Patent Number: 5,422,997
[45] Date of Patent: Jun. 6, 1995

[54] TEXTURE ADDRESS GENERATOR, TEXTURE PATTERN GENERATOR, TEXTURE DRAWING DEVICE, ADN TEXTURE ADDRESS GENERATING METHOD

[75] Inventor: Ichiro Nagashima, Yokohama, Japan

[73] Assignee: Kabushiki Kaisha Tsohiba, Kawasaki, Japan

[21] Appl. No.: 88,651

[22] Filed: Jul. 9, 1993

[30] Foreign Application Priority Data

Jul. 9, 1992 [JP] Japan ................................. 4-182308

[51] Int. Cl.⁶ ............................................. G06F 12/06
[52] U.S. Cl. ...................................... 395/166; 364/736
[58] Field of Search .................. 395/130, 162–166, 395/400, 425; 364/736; 345/201, 200

[56] References Cited

U.S. PATENT DOCUMENTS 4,949,292  8/1990  Hoshino et al. ..................... 364/736
5,187,795  2/1993  Balmforth et al. .................. 364/736

*Primary Examiner*—Mark R. Powell
*Assistant Examiner*—Kee M. Tung
*Attorney, Agent, or Firm*—Foley & Lardner

[57] ABSTRACT

A texture address generator has a first register for storing an n-th cycle texture address, a second register for storing an increment for the n-th cycle texture address, a third register for storing a constant for updating contents in the second register, an adder for adding the texture address stored in the first register to the increment stored in the second register, for each cycle, and for updating contents of the first register with a result of the addition, for each cycle, and multiplier for multiplying the increment stored in the second register by the constant stored in the third register, for each cycle, and updating contents of the second register with a result of the multiplication, for each cycle.

15 Claims, 5 Drawing Sheets

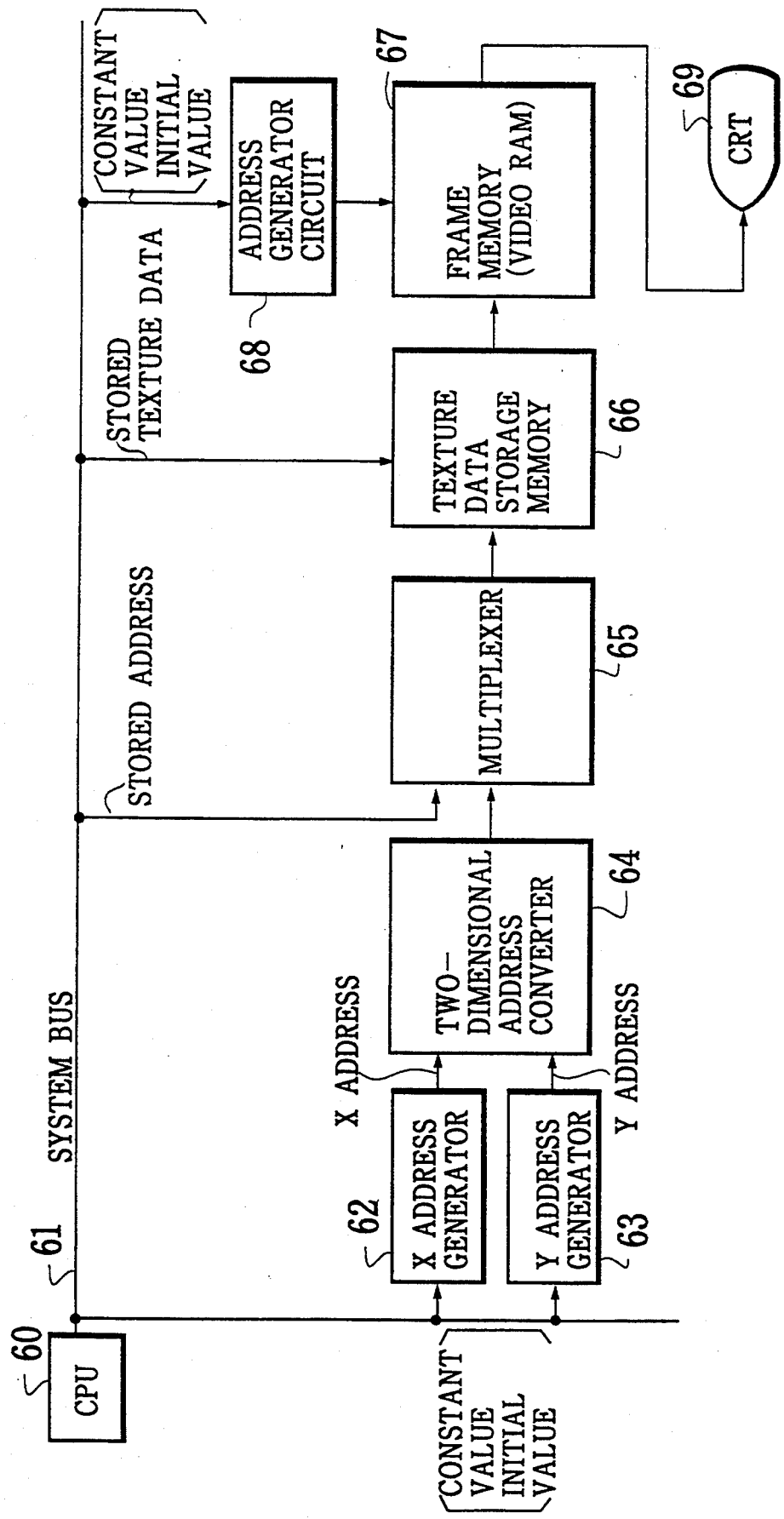

TEXTURE ADDRESS GENERATOR, TEXTURE PATTERN GENERATOR, TEXTURE DRAWING DEVICE, ADN TEXTURE ADDRESS GENERATING METHOD

BACKGROUND OF THE INVENTION

1. Field of the Invention

The present invention relates to a texture drawing device used in computer graphics (CG), and, in particular, to a texture address generator, a texture pattern generator, a texture drawing device, and a texture address generating method used for generating texture patterns during texture mapping process.

2. Description of the Prior Art

In a texture mapping process frequently used in computer graphics (CG) and the like, when a pixel is written into a memory or a display, coordinates are exchanged by using a coordinate (X',Y) as a position of a relevant pixel in a display coordinate system and by using a Z-position corresponding to the relevant pixel in a perspective coordinate system. Then, an address for a model coordinate system is generated and texture data is read out so that the relevant pixel is brightly reflected.

The coordinate exchange process in this type of the textured mapping process is illustrated as follows.

When the respective coordinates are set as follows:
Texture coordinates: (X, Y)
Word coordinates: (X', Y', Z')
Perspective coordinates: (X", Y", Z")
Display coordinates: (X", Y")
the following relationships apply:
$X' = (R \times X'')/(R+Z'')$ (perspective reverse transformation)
$Y' = (R \times Y'')/(R+Z'')$
$Z' = (R \times Z'')/(R+Z'')$
$X = a \times X' + d \times Y' + g \times Z' + 1$ (affin transformation)
$Y = b \times X' + e \times Y' + h \times Z' + m$
where R, a, d, g, b, e, h, and m are constants.
Accordingly, $$X = (a \times R \times X'')/(R+Z'') + (d \times R \times Y'')/(R+Z'') + (g \times R \times Z'')/(R+Z'') + 1 \quad \text{[Equation 1.1]}$$

where a, R, d, and g are constants.

$$Y = (b \times R \times X'')/(R+Z'') + (e \times R \times Y'')/(R+Z'') + (h \times R \times Z'')/(R+Z'') + m \quad \text{[Equation 1.2]}$$

where b, R, e, h, and m are constants.

Further, an approximation can be given for $Z''$ by linear interpolation, as follows.

$$Z'' = c \times X'' + f \times Y'' + n \quad \text{[Equation 1.3]}$$

where c, f, and n are constants.

As a result, the relationship between the texture coordinates and the display coordinates can be shown as follows.

$$\begin{aligned} X &= (a \times R \times X'')/(R + (c \times X'' + f \times Y'' + n)) + \\ & (d \times R \times Y'')/(R + (c \times X'' + f \times Y'' + n)) + \\ & (g \times R \times (c \times X'' + f \times Y'' + n))/ \\ & (R + (c \times X'' + f \times Y'' + n)) + 1 \\ &= (R \times ((a + g \times c) \times X'' + (d + g \times f) \times Y'' + g \times n))/ \\ & (R + c \times X'' + f \times Y'' + n) + 1 \end{aligned} \quad \text{[Equation 2.1]}$$

where a, c, f, n, d, R, g are constants.

$$\begin{aligned} Y &= (b \times R \times X'')/(R + (c \times X'' + f \times Y'' + n)) + \\ & (e \times R \times Y'')/(R + (c \times X'' + f \times Y'' + n)) + \\ & (h \times R \times (c \times X'' + f \times Y'' + n))/ \\ & (R + (c \times X'' + f \times Y'' + n)) + m \\ &= (R \times ((b + h \times c) \times X'' + (e + h \times f) \times Y'' + h \times n))/ \\ & (R + c \times X'' + f \times Y'' + n) + m \end{aligned} \quad \text{[Equation 2.2]}$$

where b, R, c, f, n, e, h are constants.

In this manner, the process of transferring coordinates from display coordinates to texture coordinates in the texture mapping process becomes a process which includes division processes shown in Equations 2.1 and 2.2 described above.

Furthermore, it is necessary to execute the above-mentioned calculation shown in Equations 2.1 and 2.2 each time one pixel is drawn and, as a result, a very large volume of calculations is required.

Because these types of processes has been conventionally handled by software, so that a great deal of time is required. For this reason it has not been possible to draw while monitoring animation implemented by the texture mapping process, in real time and is a problem.

In addition, because rather complicated calculations are necessary in the coordinate transformation process, as illustrated by the above-mentioned Equations 2.1 and 2.2, there is the inconvenience that hardware for providing these calculations becomes complicated and therefore large.

SUMMARY OF THE INVENTION

Accordingly, an object of the present invention is, with due consideration to the drawbacks of such conventional texture drawing devices and methods, to provide a texture address generator, a texture pattern generator, a texture drawing device, and a texture address generating method for performing an approximate coordinate transformation process by generating texture addresses at high speed, the speed is equal to the speed of writing pixel data to a memory.

In addition, another object of the present invention is to provide a texture pattern generator for reading out texture data from the generated address for generating texture patterns, as well as to provide a texture drawing device for drawing and displaying a texture pattern.

The objects of the present invention are accomplished with a texture address generator comprising:
first storage means for storing an n-th cycle texture address;
second storage means for storing an increment for the n-th cycle texture address;
third storage means for storing a constant for updating contents in the second storage means;
addition updating means for adding the texture address stored in the first storage means to the increment stored in said second storage means, for each cycle, and for updating contents of said first storage means with a result of the addition, for each cycle; and
multiplication updating means for multiplying the increment stored in the second storage means by the constant stored in said third storage means, for each cycle, and updating contents of the second storage means with a result of the multiplication, for each cycle.

In addition, the objects of the present invention are accomplished with a texture address generator according to claim 1, which further comprises a fourth storage means for storing an initial value of the texture address for a horizontal line direction of a display coordinate system, wherein
   said second storage means comprises:
      fifth storage means for storing an initial value of increment of change of the texture address corresponding to a horizontal shift in the display coordinate system;
      sixth storage means for storing the increments of the texture address corresponding to the horizontal shift in the display coordinate system; and
      seventh storage means for storing the increment of the texture address corresponding to a vertical shift in the display coordinate system, and
   said third storage means comprises:
      eight storage means for storing a first constant for updating contents of said sixth storage means; and
      ninth storage means for storing a second constant for updating contents of said seventh storage means.

Further, the objects of the present invention are accomplished with a texture address generator according to claim 1, further comprising:
   a random number generator for generating random numbers;
   addition means for adding a random number generated by the random number generator to the texture address stored in said first storage means, and outputting the results of the addition as a texture address.

Moreover, the another objects of the present invention are accomplished with a texture pattern generator comprising:
   a first address generator for generating a texture X-address;
   a second address generator for generating a texture Y-address;
   address converting means connected to said first and second texture address generators, for generating physical addresses based on the texture X-address and the texture Y-address output from said first address generator and said second address generator, respectively; and
   pattern data storage means connected to the address converting means, for storing data for texture patterns and outputting data for texture patterns based on a physical address provided by the address converting means,
   wherein said first and second texture address generators are texture address generators as claimed in claim 1.

Moreover, the another objects of the present invention are accomplished with a texture drawing device comprising:
   a system bus;
   a processor connected to said system bus for controlling said texture drawing device;
   first and second texture address generators for receiving a first initial value and a constant value from said processor via said system bus, and generating a texture X-address and a texture Y-address synchronized with an input clock signal, respectively;
   address converting means connected to said first and second texture address generators, for generating a first physical address based on the texture X-address and the texture Y-address;
   a multiplexer for selecting address transferred from said processor and said address converting means;
   pattern data storage means for storing texture data corresponding to predetermined texture pattern data based on address selected by said multiplexer, and for outputting a part of said texture data based on a physical address provided by the address converting means selected by said multiplexer;
   a physical address generator for receiving a second initial value from said processor through said system bus, and for generating a second physical address synchronized with an input clock signal;
   a frame memory connected to said pattern data storage means, for storing said part of said texture data in a location shown by a physical address provided by said physical address generator; and
   display means connected to said frame memory for displaying drawing based on output from said frame memory, wherein,
   said first and second texture address generators are said texture address generator as claimed in claims 1.

Furthermore, the another objects of the present invention are accomplished with a texture pattern generator comprising:
   a system bus;
   a processor connected to said system bus for controlling said texture drawing device;
   first and second texture address generators for receiving a first initial value and a constant value from said processor via said system bus, and generating a texture X-address and a texture Y-address synchronized with an input clock signal, respectively;
   address converting means connected to said first and second texture address generators, for generating a first physical address based on the texture X-address and the texture Y-address;
   pattern data storage means for storing texture data corresponding to predetermined texture pattern and for outputting a part of said texture data based on a physical address provided by the address converting means via a dedicated address bus, and said dedicated bus connected between said address converting means and said address converting means and said pattern data storage means;
   a physical address generator for receiving a second initial value from said processor through said system bus, and for generating a second physical address synchronized with an input clock signal;
   a frame memory connected to said pattern data storage means, for storing said part of said texture data in a location shown by a physical address provided by said physical address generator; and
   display means connected to said frame memory for displaying drawing based on output from said frame memory, wherein,
   said first and second texture address generators are said texture address generator as claimed in claims 1.

Moreover, the another objects of the present invention are accomplished with a texture address generating method executed by a texture address generator, comprising steps of:
   step for adding a texture address for the n-th cycle stored in a first storage register with the increment stored in a second register;
   step for storing the result of addition to the first register as a texture address for the (n +1)th cycle;

step for multiplying the increment of the texture address for the n-th cycle by a constant stored in a third register; and step for storing the result of the multiplication to a second register as an increment of the texture address for the (n+1)th cycle.

BRIEF DESCRIPTION OF THE DRAWINGS

These and other objects, features, and advantages of the present invention will become more apparent from the following description of the preferred embodiments taken in conjunction with the accompanying drawings, in which:

FIG. 6 is a diagram showing a configuration of a texture drawing device of the present invention.

DETAILED DESCRIPTION OF THE PREFERRED EMBODIMENTS

Other features of this invention will become apparent in the course of the following description of exemplary embodiments which are given for illustration of the invention and are not intended to be limiting thereof.

First, we explain the basic idea of the present invention briefly, then will describe preferred embodiment of the present invention.

An increment as a first differential value of a texture address is renewed by means of a multiplication result in which a constant is multiplied to the increment for the texture address. In this manner the texture address is renewed from the result of adding the renewed increment to the texture address in order to execute an approximate transformation processes from pixel addresses of the display coordinate system to texture addresses of a model coordinate system.

Next, an explanation of a texture address generator as a preferred embodiment according to the present invention will now be given with reference to the drawings.

Figure 1:
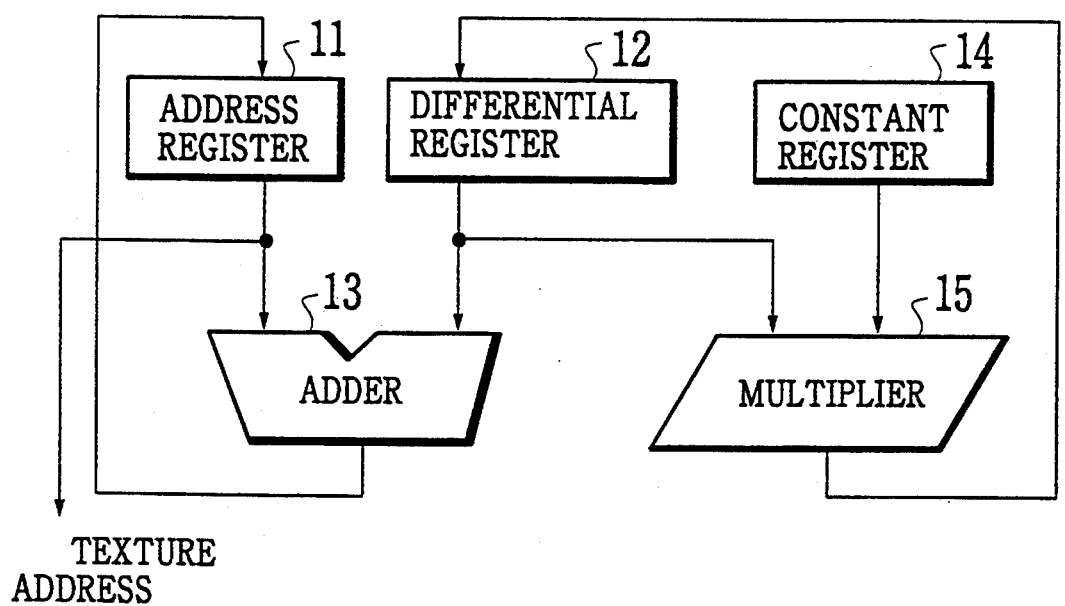
FIG. 1 is a diagram showing a configuration of a texture address generator of the present invention.

FIG. 1 is a diagram showing a configuration of a texture address generator of the present invention, and corresponds to a configuration.

In FIG. 1, an address register 11 for holding texture address, a differential register 12 for storing a primary differential value (an increment value) for the texture address, and an adder 13 for adding the content stored in the address register 11 and the content stored in the differential register 12. The output from the adder 13 is transferred to the address register 11 to renew the content thereof. The adder 13 has a configuration identical to those in an address generator based on a normal digital differential analyzer (DDA).

The special feature of the texture address generator shown in FIG. 1 of this embodiment is that the primary differential value from the differential register 12 is multiplied with a constant set in a constant register 14 by means of a multiplier 15, and the content set in the differential register 12 is renewed at each cycle with the value from the multiplier 15 as the result of this multiplication operation.

On the other hand, the primary differential value is a constant when a normal conventional digital differential analyzer (DDA) is used.

When:
Texture address value of the nth cycle: An
Primary differential value of the nth cycle: Dn
Initial set value of the address register 11:AO
Initial set value of the differential register 12:DO
Set value of the constant register 14: C
then:

$A(n+1) = An + Dn$
$D(n+1) = Dn \times C$

Accordingly, $An + 1 = An + Dn \times C$ [Equation 3.0]
$An = AO + DO \times C \times (C^n - 1)/(C - 1)$
$= (AO - DO \times C/(C - 1)) + (DO \times C/(C - 1)) \times C^n$ The special feature of the present invention, as clearly shown by the above equation, is that the primary differential value stored in the differential register 12 is renewed from the results of multiplying the first derivative value by a constant, and therefore a texture address is obtained by adding the renewed primary differential value and the texture address.

In the above-outlined equation for transformation from display coordinates to texture coordinates, Y" in the display coordinates becomes a constant in the case where the written-in pixel is shifted toward the scanning direction, so that the texture coordinates are transformed as shown below.

$X = CNST0 + (CNST2 \times X'' + CNST4)/(CNST6 \times X''+ CNST7)$ [Equation 4.1]

$Y = CNST1 + (CNST3 \times X'' + CNST5)/(CNST6 \times X'' + CNST7)$ [Equation 4.2]

where:
CNST0=1
CNST1=m
CNST2=R×(a+g×c)
CNST3=R×(b+h×c)
CNST4=R×(d+g×f)×Y"+g×n
CNST5=R×(e+h×f)×Y"+h×n
CNST6=C
CNST7=R+f×Y"+n When the transformation process executed by the texture address generator based on Equation 4.1 and 4.2 for the present invention as described above is compared with a transformation process based on Equation 2.1 and 2.2 which is conventionally used, it is seen that it is unnecessary to perform a division process for the present invention, and the process details are extremely simplified in comparison with the conventional process.

As a result, the transformation process can performed at high speed to a degree which can correspond to animation, and the configuration also becomes extremely simple.

In addition, in the present invention, the mapping precision is slightly reduced in comparison with the conventionally used transformation process because a means which approximates the original transformation is adopted.

However, there is a marked increase in precision as compared to the case where the first derivative is taken as a constant, therefore it is possible to obtain an image in which the texture process is implemented with no visual inconsistencies or a real time.

Figure 2:
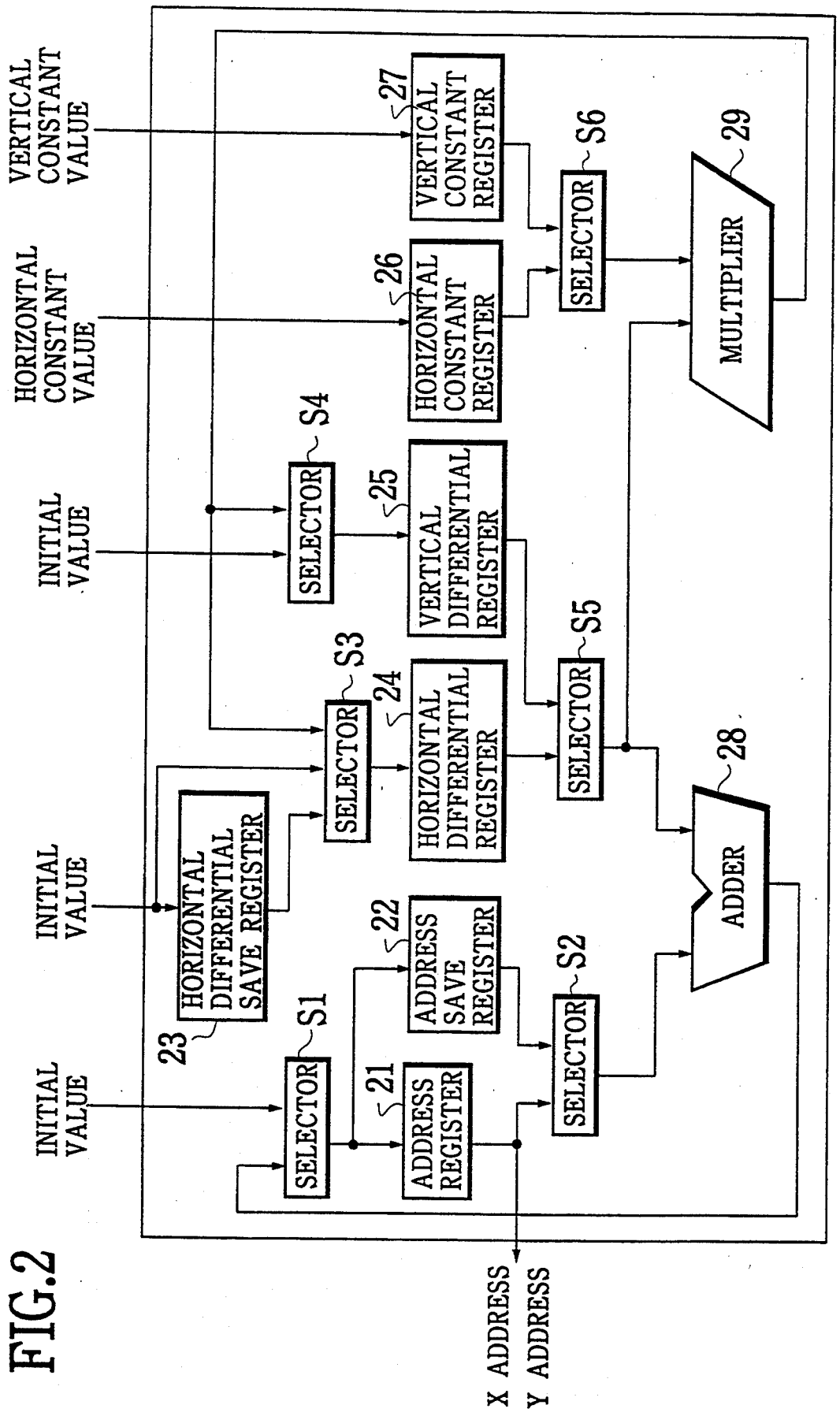
FIG. 2 is a diagram showing a specific configuration of the texture address generator illustrated in FIG. 1.

FIG. 2 is a diagram showing a specific configuration of the texture address generator illustrated in FIG. 1.

The texture address generator shown in FIG. 2 generates an X and a Y address for the respective texture data.

In FIG. 2, an initial value for the texture address is set in an address register 21 and an address save register 22 via a selector S1.

Also, an initial value for a horizontal differential operation is set in a horizontal differential register 24 and an initial value for a vertical increment is set in a vertical differential register 25 via a selector S3 and a selector S4 respectively.

In addition, the initial value for the horizontal differential operation is set in a horizontal differential save register 23; a horizontal constant value is set in a horizontal constant register 26; and a vertical constant value is set in a vertical constant register 27.

Next, each time a pixel is moved in the scan line direction (horizontal direction) of the display coordinate system, the output from the address register 21 selected by the selector S2 and the output from the horizontal differential register 24 selected by the selector S5 are added together by an adder 28 and the content of the address register 21 is renewed from the result of this addition.

Also, the output from the horizontal differential register 24 selected by the selector S5 and the output from the horizontal constant register 26 selected by the selector S6 are multiplied together by a multiplier 29 and the horizontal increment register 24 is renewed from the result of this multiplication.

In addition, when the movement in the scan line direction of the display coordinate system has been completed, each time a pixel is moved in the vertical direction, the output from the address save register 22 selected by the selector S2 and the output from the vertical increment register 25 selected by the selector S5 are added together by the adder 28 and the address register 21 and the address save register 22 are renewed from the result of this addition. Also, the horizontal increment register 24 is renewed by the output from the horizontal increment save register 23 selected by the selector S3.

Further, the output from the vertical increment register 25 selected by the selector S5 and the output from the vertical constant register 27 selected by the selector S6 are multiplied together by the multiplier 29 and the vertical increment register 25 is renewed from the result of this multiplication through the selector S4.

The above operation is carried out repeatedly while scanning a rectangular area on the display coordinate system, and the texture X-address and the texture Y-address are generated for the texture data for a pixel to be written.

Figure 3:
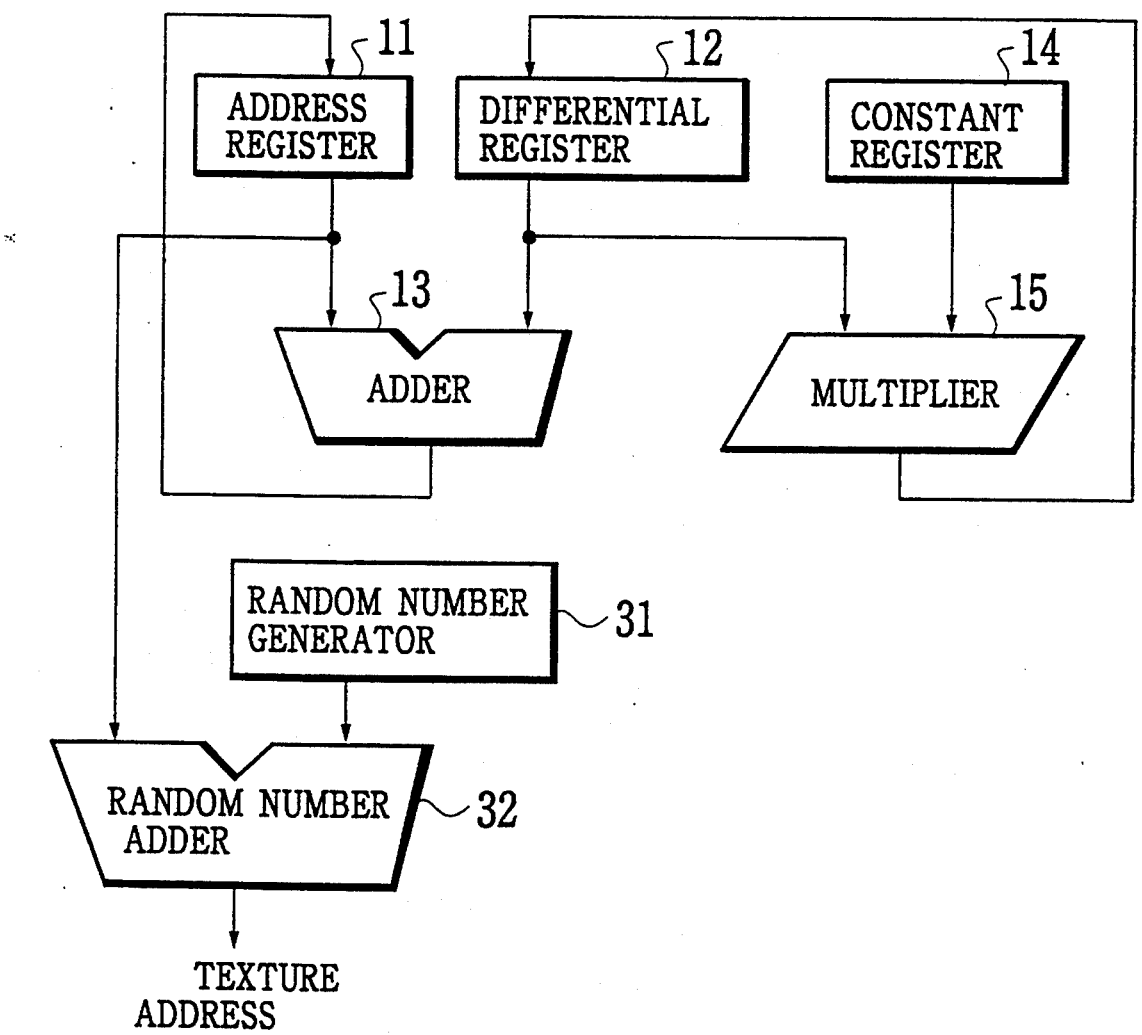
FIG. 3 is a diagram showing another configuration of a texture address generator of the present invention.

FIG. 3 is a diagram showing another configuration of a texture address generator of the present invention.

A special feature of the configuration shown in FIG. 3 is that instead of outputting the output from the address registers 11, 21 without change as the texture addresses from the texture address generators illustrated in FIG. 1 and FIG. 2, a random number is generated by a random number generator 31 and the generated random number is added to the output from the address register by a random number adder 32. The result of the addition is output as the texture address.

With this type of configuration, a sampling position for texture data accessed by means of the generated texture address can be changed by the random number so that it is possible to relieve the borders of the texture patterns between two adjacent pixels in the case where pixels at the adjoining texture addresses become large and prominent and to make these borders inconspicuous.

Figure 4:
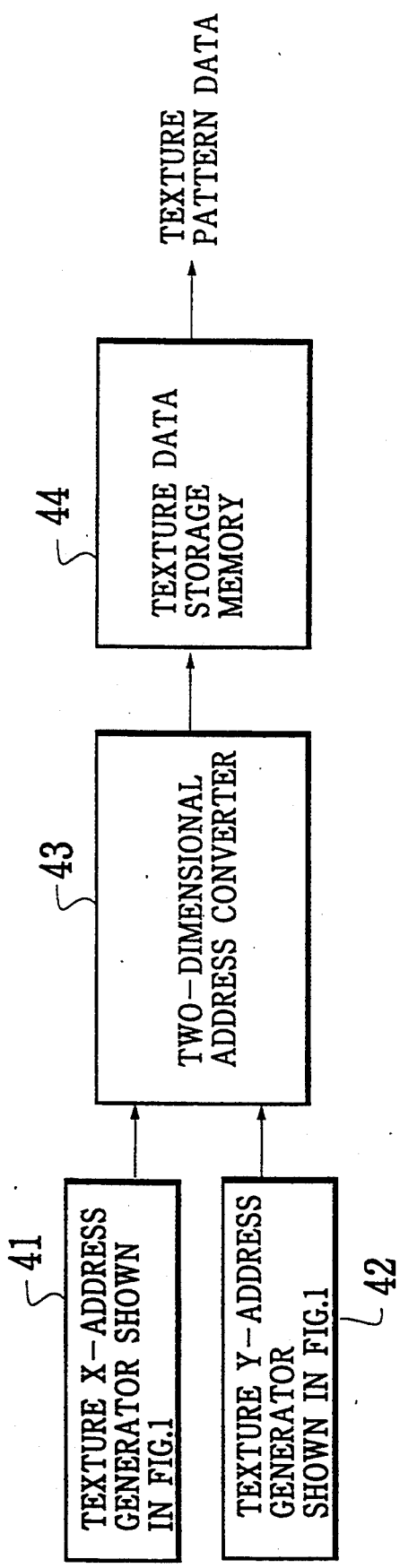
FIG. 4 is a diagram showing a configuration of a texture pattern generator of the present invention.

FIG. 4 is a diagram showing a configuration of a texture pattern generator of the present invention.

The texture pattern generator illustrated in FIG. 4 comprises texture address generators 41 and 42, a two-dimensional address converter 43, and a texture data storage memory for storing the output from the two-dimensional address converter 43.

The texture address generators 41, 42 are made up of a pair of the texture address generators shown in FIG. 1, FIG. 2, and in FIG. 3.

In the texture pattern generator shown in FIG. 4 X-address and Y-address are generated by the texture x-address and y-address generators 41 and 42 and then converted to a one-dimensional address by the two-dimensional address converter 43.

The texture data from the two-dimensional address convertor 43 is stored in a memory 44.

A texture pattern is generated by reading out the texture data at the one-dimensional address at which the data stored in the memory 44 is obtained from the converter 43.

In this manner, it is possible to access the texture data at high speed because the memory 44 in which the texture data is stored is built into the texture pattern generator shown in FIG. 4.

In addition, it is desired to cope with a large number of textures in a system, but because of various restrictions such as the chip area and the like there are cases where it is not possible to ensure sufficient volume for a memory in which high speed access is possible.

In such a case, the memory 44 in which the texture data is stored may be formed together with a secondary memory which has low access speed but in which large volume is readily realized by means of a primary memory made from a cache memory and a primary memory.

Figure 5:
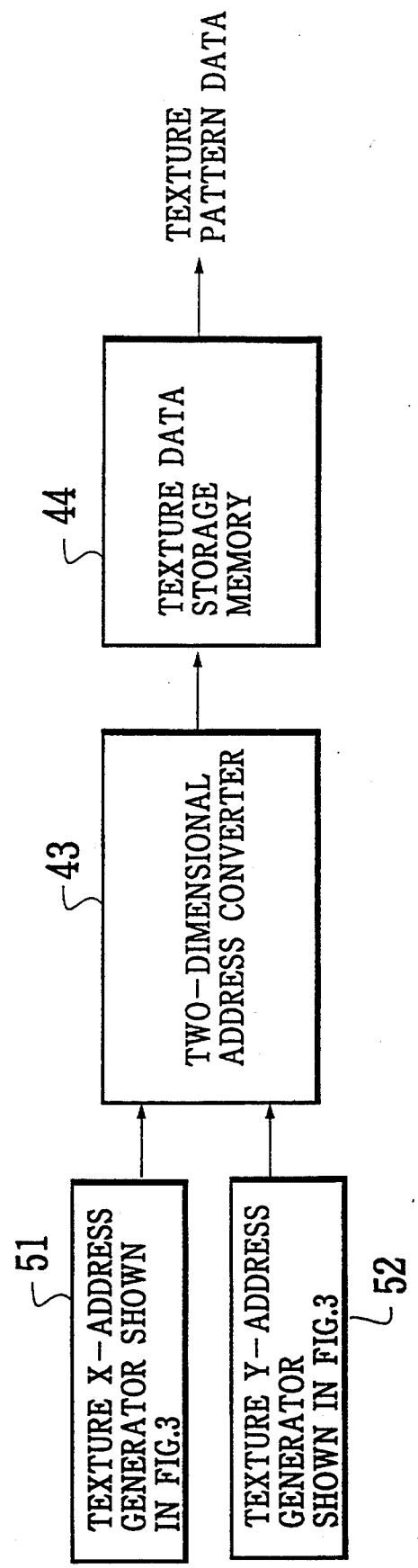
FIG. 5 is a diagram showing another configuration of a texture pattern generator of the present invention.

FIG. 5 is a diagram showing another configuration of a texture pattern generator of the present invention.

A special feature of the configuration shown in FIG. 5 is that, rather than the configuration shown in FIG. 4, the texture X, Y address generators 51, 52 are formed as the texture address generators shown in FIG. 3, while the rest of the configuration is the same as in FIG. 4.

Accordingly, in the configuration of the texture pattern generator shown in FIG. 5, the effects obtained from the configurations of FIG. 3 and FIG. 4 can be obtained simultaneously.

FIG. 6 is a diagram showing a configuration of a texture drawing device of the present invention.

In the texture drawing device shown in FIG. 6, a CPU 60 acts as the central control means of the device. The various signals required by the system and the operating clock signals are provided from the CPU 60 through a system bus 61. A texture X-address generator 62, a texture Y-address generator 63, a two-dimensional address converter 64, and a texture data memory 66 are the same as in the configurations shown in FIG. 4 and FIG. 5.

A constant value and an initial value are provided from the CPU 60 and set in the X-address and Y-address generators 62 and 63 via the system bus 61.

The texture data according to an original predetermined texture pattern is provided to the texture data memory 66 as a pattern data storage means under the control by the CPU 60 through the system bus 61 and stored in an area addressed by an address in the texture data storage memory 66. The address designating the area in the texture data storage memory 66 is selected by a multiplexer 65 and then transferred through the system bus 61.

The texture data stored in the memory 66 is read out based on a one-dimensional address (physical address) selected by the multiplexer 65. The one-dimensional address (physical address) is obtained by the two-dimensional address converter 64.

The read-out texture data is stored in a frame memory (video RAM) 67 according to the output (physical address) of an address generator circuit 68 in which the constant value and the initial value are set from the CPU 60 via the system bus 61, and the stored data is drawn and displayed on a CRT 69, so that it is possible to obtain an image provided by the texture process.

Further, in the texture drawing device shown in FIG. 6, instead of using the multiplexer 65, the stored address may also be provided to the memory 66 from the two-dimensional address converter 64 via a dedicated bus.

As can be understood from the foregoing explanation, by means of the present invention, a first derivative value (an increment) is renewed by the result from the multiplication of a constant with the first derivative value in a digital differential analyzing means so that a texture address for a model coordinate system is obtained.

Therefore a simple and small structure can be formed and a texture address can be obtained at high speed.

As a result, it is possible to implement a texture process for animation with very little loss of precision.

While the invention has been described with reference to a specific embodiment, the description is not meant to be construed in a limiting sense. Various modification of the disclosed embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A texture address generator comprising:
   first storage means for storing an n-th cycle texture address;
   second storage means for storing an increment for the n-th cycle texture address;
   third storage means for storing a constant for updating contents in the second storage means;
   addition updating means for adding the texture address stored in the first storage means to the increment stored in said second storage means, for each cycle, and for updating contents of said first storage means with a result of the addition, for each cycle; and
   multiplication updating means for multiplying the increment stored in the second storage means by the constant stored in said third storage means, for each cycle, and updating contents of the second storage means with a result of the multiplication, for each cycle,
   wherein an output from the addition updating means is transmitted to the first storage means, an output from the multiplication updating means is transmitted to the second storage means, and the texture address is generated by the texture address generator every cycle.

2. A texture address generator comprising:
   first storage means for storing an n-th cycle texture address;
   second storage means for storing an increment for the n-th cycle texture address;
   third storage means for storing a constant for updating contents in the second storage means;
   addition updating means for adding the texture address stored in the first storage means to the increment stored in said second storage means, for each cycle, and for updating contents of said first storage means with a result of the addition, for each cycle;
   multiplication updating means for multiplying the increment stored in the second storage means by the constant stored in said third storage means, for each cycle, and updating contents of the second storage means with a result of the multiplication, for each cycle; and
   a fourth storage means for storing an initial value of the texture address for a horizontal line direction of a display coordinate system, wherein
   said second storage means includes
      fifth storage means for storing an initial value of increment of change of the texture address corresponding to a horizontal shift in the display coordinate system,
      sixth storage means for storing the increments of the texture address corresponding to the horizontal shift in the display coordinate system, and
      seventh storage means for storing the increment of the texture address corresponding to a vertical shift in the display coordinate system, and
   said third storage means includes
      eighth storage means for storing a first constant for updating contents of said sixth storage means, and
      ninth storage means for storing a second constant for updating contents of said seventh storage means.

3. A texture address generator comprising:
   first storage means for storing an n-th cycle texture address;
   second storage means for storing an increment for the n-th cycle texture address;
   third storage means for storing a constant for updating contents in the second storage means;
   addition updating means for adding the texture address stored in the first storage means to the increment stored in said second storage means, for each cycle, and for updating contents of said first storage means with a result of the addition, for each cycle;
   multiplication updating means for multiplying the increment stored in the second storage means by the constant stored in said third storage means, for each cycle, and updating contents of the second storage means with a result of the multiplication, for each cycle;
   a random number generator for generating random numbers; and
   addition means for adding a random number generated by the random number generator to the texture address stored in said first storage means, and outputting the results of the addition as a texture address.

4. A texture address generator according to claim 2 comprising:
- a random number generator for generating random numbers;
- an addition means for adding a random number generated by the random number generator to the texture address stored in said first storage means, and outputting the results of the addition as a texture address.

5. A texture pattern generator comprising:
- a first address generator for generating a texture X-address and a second address generator for generating a texture Y-address, said first and second address generators each including
  - first storage means for storing an n-th cycle texture address,
  - second storage means for storing an increment for the n-th cycle texture address,
  - third storage means for storing a constant for updating contents in the second storage means,
  - addition updating means for adding the texture address stored in the first storage means to the increment stored in said second storage means, for each cycle, and for updating contents of said first storage means with a result of the addition, for each cycle, and
  - multiplication updating means for multiplying the increment stored in the second storage means by the constant stored in said third storage means, for each cycle, and updating contents of the second storage means with a result of the multiplication, for each cycle;
- address converting means connected to said first and second texture address generators, for generating physical addresses based on the texture X-address and the texture Y-address output from said first address generator and said second address generator, respectively; and
- pattern data storage means connected to the address converting means, for storing data for texture patterns and outputting data for texture patterns based on a physical address provided by the address converting means 6. A texture pattern generator according to claim 5, said first and second address generators further including
- a fourth storage means for storing an initial value of the texture address for a horizontal line direction of a display coordinate system, wherein
- said second storage means includes
  - fifth storage means for storing an initial value of increment of change of the texture address corresponding to a horizontal shift in the display coordinate system,
  - sixth storage means for storing the increments of the texture address corresponding to the horizontal shift in the display coordinate system, and
  - seventh storage means for storing the increment of the texture address corresponding to a vertical shift in the display coordinate system, and
- said third storage means includes
  - eighth storage means for storing a first constant for updating contents of said sixth storage means, and
  - ninth storage means for storing a second constant for updating contents of said seventh storage means.

7. A texture pattern generator according to claim 5, said first and second address generators further including
- a random number generator for generating random numbers, and
- addition means for adding a random number generated by the random number generator to the texture address stored in said first storage means, and outputting the results of the addition as a texture address.

8. A texture drawing device comprising:
- a system bus;
- a processor connected to said system bus for controlling said texture drawing device;
- first and second texture address generators for receiving a first initial value and a constant value from said processor via said system bus, and generating a texture X-address and a texture Y-address synchronized with an input clock signal, respectively, said first and second texture address generators each including
  - first storage means for storing an n-th cycle texture address,
  - second storage means for storing an increment for the n-th cycle texture address,
  - third storage means for storing a constant for updating contents in the second storage means,
  - addition updating means for adding the texture address stored in the first storage means to the increment stored in said second storage means, for each cycle, and for updating contents of said first storage means with a result of the addition, for each cycle, and
  - multiplication updating means for multiplying the increment stored in the second storage means by the constant stored in said third storage means, for each cycle, and updating contents of the second storage means with a result of the multiplication, for each cycle;
- address converting means connected to said first and second texture address generators, for generating a first physical address based on the texture X-address and the texture Y-address;
- a multiplexer for selecting an address transferred from said processor and said address converting means;
- pattern data storage means for storing texture data corresponding to predetermined texture pattern data based on the address selected by said multiplexer, and for outputting a part of said texture data based on a physical address provided by the address converting means selected by said multiplexer;
- a physical address generator for receiving a second initial value from said processor through said system bus, and for generating a second physical address synchronized with an input clock signal;
- a frame memory connected to said pattern data storage means, for storing said part of said texture data in a location shown by a physical address provided by said physical address generator; and
- display means connected to said frame memory for displaying a drawing based on an output from said frame memory.

9. A texture drawing device according to claim 8, said first and second texture address generators further including fourth storage means for storing an initial value of the texture address for a horizontal line direction of a display coordinate system, wherein said second storage means includes fifth storage means for storing an initial value of increment of change of the texture address corresponding to a horizontal shift in the display coordinate system, sixth storage means for storing the increments of the texture address corresponding to the horizontal shift in the display coordinate system, and seventh storage means for storing the increment of the texture address corresponding to a vertical shift in the display coordinate system, and said third storage means includes eighth storage means for storing a first constant for updating contents of said sixth storage means, and ninth storage means for storing a second constant for updating contents of said seventh storage means.

10. A texture drawing device according to claim 8, said first and second texture address generators further including a random number generator for generating random numbers, and addition means for adding a random number generated by the random number generator to the texture address stored in said first storage means, and outputting the results of the addition as a texture address.

11. A texture drawing device comprising:

a system bus;

a processor connected to said system bus for controlling said texture drawing device;

first and second texture address generators for receiving a first initial value and a constant value from said processor via said system bus, and generating a texture X-address and a texture Y-address synchronized with an input clock signal, respectively, Said first and second texture address generators each including first storage means for storing an n-th cycle texture address, second storage means for storing an increment for the n-th cycle texture address, third storage means for storing a constant for updating contents in the second storage means, addition updating means for adding the texture address stored in the first storage means to the increment stored in said second storage means, for each cycle, and for updating contents of said first storage means with a result of the addition, for each cycle, and multiplication updating means for multiplying the increment stored in the second storage means by the constant stored in said third storage means, for each cycle, and updating contents of the second storage means with a result of the multiplication, for each cycle;

address converting means connected to said first and second texture address generators, for generating a first physical address based on the texture X-address and the texture Y-address;

pattern data storage means for storing texture data corresponding to predetermined texture pattern and for outputting a part of said texture data based on a physical address provided by the address converting means via a dedicated address bus, and said dedicated bus being connected between said address converting means and said address converting means and said pattern data storage means;

a physical address generator for receiving a second initial value from said processor through said system bus, and for generating a second physical address synchronized with an input clock signal;

a frame memory connected to said pattern data storage means, for storing said part of said texture data in a location shown by a physical address provided by said physical address generator; and display means connected to said frame memory for displaying a drawing based on an output from said frame memory.

12. A texture drawing device according to claim 11, said first and second texture address generators further including a fourth storage means for storing an initial value of the texture address for a horizontal line direction of a display coordinate system, wherein said second storage means includes fifth storage means for storing an initial value of increment of change of the texture address corresponding to a horizontal shift in the display coordinate system, sixth storage means for storing the increments of the texture address corresponding to the horizontal shift in the display coordinate system, and seventh storage means for storing the increment of the texture address corresponding to a vertical shift in the display coordinate system, and said third storage means includes eighth storage means for storing a first constant for updating contents of said sixth storage means, and ninth storage means for storing a second constant for updating contents of said seventh storage means.

13. A texture drawing device according to claim 11, said first and second texture address generators further including a random number generator for generating random numbers, and addition means for adding a random number generated by the random number generator to the texture address stored in said first storage means, and outputting the results of the addition as a texture address.

14. A method of generating a texture address for a plurality of cycles, in a texture address generator having a first, second and third storage element, an adder and a multiplier, the method comprising the steps of:

storing an n-th cycle texture address in the first storage element;

storing an n-th cycle increment for the n-th cycle texture address in the second storage element;

storing a constant value in the third storage element;

adding the texture address stored in the first storage element to the increment stored in the second storage element in the adder, to produce an (n+1)th cycle texture address;

updating, each cycle, the first storage element with the (n+1)th cycle texture address;

multiplying the increment stored in the second storage element by the constant stored in the third storage element in the multiplier to produce an (n+1)th cycle increment; and updating, each cycle, the second storage means with the (n+1)th cycle increment.

15. In a texture address generator having a first memory element storing a texture address, a second memory element storing a texture address increment and a third memory element storing a constant value, a method of generating a texture address for a plurality of cycles, comprising the steps of:

outputting a texture address stored in the first memory element as an n-th texture address;

updating the first memory element with an (n+1)th texture address, the (n+1)th texture address being determined according to a sum of the texture address increment and the n-th texture address;

updating the second memory element with an (n+1)th cycle increment, the (n+1)th cycle increment being determined according to a multiplication of the constant stored in the third memory element and the n-th cycle increment; and repeating the above steps for the plurality of cycles.

* * * * *